(12) United States Patent
Zhang et al.

(10) Patent No.: US 12,017,354 B2
(45) Date of Patent: Jun. 25, 2024

(54) PNEUMATIC-CONTROLLED PITCH-ADJUSTABLE TELESCOPIC MECHANISM USED FOR ROBOTIC ARM

(71) Applicant: Guangzhou College of Technology and Business, Foshan (CN)

(72) Inventors: Xianfeng Zhang, Zhongshan (CN); Junrong Li, Zhongshan (CN); Yuehui Wang, Zhongshan (CN)

(73) Assignee: Guangzhou College of Technology and Business, Foshan (CN)

( * ) Notice: Subject to any disclaimer, the term of this patent is extended or adjusted under 35 U.S.C. 154(b) by 0 days.

(21) Appl. No.: 17/418,078

(22) PCT Filed: Jul. 2, 2020

(86) PCT No.: PCT/CN2020/099963
§ 371 (c)(1),
(2) Date: Dec. 9, 2022

(87) PCT Pub. No.: WO2021/196438
PCT Pub. Date: Oct. 7, 2021

(65) Prior Publication Data
US 2023/0119083 A1    Apr. 20, 2023

(30) Foreign Application Priority Data

Mar. 31, 2020   (CN) .......................... 202010245762.3

(51) Int. Cl.
*B25J 9/14*      (2006.01)
*F15B 15/16*     (2006.01)

(52) U.S. Cl.
CPC ............... *B25J 9/144* (2013.01); *F15B 15/16* (2013.01)

(58) Field of Classification Search
CPC ....................................................... B25J 9/144
See application file for complete search history.

(56) References Cited

U.S. PATENT DOCUMENTS

2020/0038273 A1 *  2/2020  Rubaek ............... A61G 7/1019

FOREIGN PATENT DOCUMENTS

| CN | 105033738 A | * | 11/2015 |
| CN | 110281270 A | * | 9/2019 |

(Continued)

*Primary Examiner* — Thomas E Lazo

(57) ABSTRACT

The present invention discloses a pneumatic-controlled pitch-adjustable telescopic mechanism used for a robotic arm, which belongs to the technical field of robotic arm pneumatic control movement, comprising a sliding block, a fixed block and a driving device, the fixed block is in a fixed position; the sliding block slides relative to the fixed block according to a predetermined movement track, which is used to adjust the distance between the sliding block and the fixed block; the driving device is used to provide power to drive; a sliding bar is disposed between the driving device and the sliding block, one end of the sliding bar is fixedly connected to the driving device, and the other end is slidingly connected to the sliding block, which is used to drive the sliding block to slide; the fixed block is provided with a fixed base and a guide mechanism, the fixed base is used to restrict the sliding bar from moving in a direction non-parallel to the predetermined movement track; the guide mechanism is used to guide the sliding block to slide along the predetermined movement track. The present invention provides a pneumatic-controlled telescopic mechanism that can adjust the length of a robotic arm joint and has a small and flexible joint; using a gas bag as a driving force, the present invention has high movement precision, and is environmentally friendly and pollution-free, and the length of the joint can be changed, increasing the flexibility of the robotic arm.

10 Claims, 5 Drawing Sheets

(56) References Cited

FOREIGN PATENT DOCUMENTS

| | | | | |
|---|---|---|---|---|
| CN | 111151936 | A * | 5/2020 | |
| CN | 111347460 | A * | 6/2020 | ............... B25J 17/02 |
| KR | 20150014137 | A * | 2/2015 | |
| WO | WO-0040378 | A1 * | 7/2000 | ............ B25J 18/025 |
| WO | WO-2014089887 | A1 * | 6/2014 | ............... B25J 18/06 |

* cited by examiner

PNEUMATIC-CONTROLLED PITCH-ADJUSTABLE TELESCOPIC MECHANISM USED FOR ROBOTIC ARM

FIELD OF THE INVENTION

The present invention generally relates to the technical field of robotic arm pneumatic control movement, and in particular relates to a pneumatic-controlled pitch-adjustable telescopic mechanism used for a robotic arm.

BACKGROUND OF THE INVENTION

In the prior art, the length of robotic arms is fixed, and joints are compact. The length of joints cannot be adjusted by the robotic arm according to the required length during use. The electric or hydraulic power is used as a driving force, resulting in excessive joint size and poor flexibility; in addition, when a robotic arm is used for internal processing in a narrow cavity, there is a problem that the robotic arm joint is too large to enter the cavity for processing.

Therefore, there is an urgent need for a telescopic mechanism for robotic arms that can adjust the length of a robotic arm joint according to the specific uses and has a small and flexible joint.

SUMMARY OF THE INVENTION

The object of the present invention is to provide a telescopic mechanism for robotic arms that can adjust the length of a robotic arm joint according to the specific uses and has a small and flexible joint. The present invention adopts the following technical solutions:

A pneumatic-controlled pitch-adjustable telescopic mechanism used for a robotic arm, comprising a sliding block, a fixed block and a driving device, the fixed block is in a fixed position; the sliding block slides relative to the fixed block according to a predetermined movement track, which is used to adjust the distance between the sliding block and the fixed block; the driving device is used to provide power to drive; a sliding bar is disposed between the driving device and the sliding block, one end of the sliding bar is fixedly connected to the driving device, and the other end is slidingly connected to the sliding block, which is used to drive the sliding block to slide according to the predetermined movement track; the fixed block is provided with a fixed bracket, and the fixed bracket comprises a fixed base and a guide mechanism, the fixed base mates with the sliding bar, which is used to restrict the sliding bar from moving in a direction non-parallel to the predetermined movement track; the guide mechanism mates with the sliding block, which is used to guide the sliding block to slide along the predetermined movement track.

Further, the number of the sliding blocks is N, and N is greater than or equal to 2, the sliding blocks include a first sliding block, a second sliding block . . . , a N–1-th sliding block, and a N-th sliding block respectively; the N–1-th sliding block slides relatively parallel to the N-th sliding block; the first sliding block is provided with a first driving working surface, a first driven working surface, and a first sliding surface; the N–1-th sliding block is provided with a N–1-th driving working surface, a N–1-th driven working surface and a N–1-th sliding surface, and the N-th sliding block is provided with a N-th driving working surface, a N-th driven working surface and a N-th sliding surface; a first sliding bar is set between the first sliding block and the driving device; one end of the first sliding bar is fixedly connected to the driving device, and the other end is slidingly connected to the first driving working surface, which is used to drive the first sliding block to slide according to the predetermined movement track; the N–1-th sliding block provides driving power for the N-th sliding block; a N-th sliding bar is disposed between the N–1-th sliding block and the N-th sliding block, the N-th sliding bar is slidingly connected to the N–1-th driven working plane, and the other end is slidingly connected to the N-th driving working surface, which is used to drive the N-th sliding block to slide according to the predetermined movement track; the N–1-th driven working plane mates with the N-th sliding bar, which is used to provide a driving opportunity to guide the N-th sliding bar to drive the N-th sliding block; the fixed block and the first sliding block are connected elastically, which is used to reset the first sliding block; the N–1-th sliding block and the N-th sliding block are connected elastically, which is used to reset the N-th sliding block; the guide mechanism mates with the N–1-th sliding surface and the N-th sliding surface, which is used to guide the N–1-th sliding block and the N-th sliding block to slide along the predetermined movement track.

Further, the number of the sliding blocks is three, which are the first sliding block, the second sliding block and the third sliding block, and the driving device is gas bag; the first sliding block is provided with a first driving working surface, a first driven working surface and a first sliding surface; the second sliding block is provided with a second driving working surface, a second driven working surface and a second sliding surface; the third sliding block is provided with a third driving working surface and a third sliding surface; the first sliding surface, the second sliding surface and the third sliding surface slide in parallel according to the predetermined movement track; the gas bag is used to provide power to drive the sliding block to slide; a first sliding bar is disposed between the gas bag and the first sliding block; one end of the first sliding bar is fixedly connected to the gas bag, and the other end is slidingly connected to the first driving working surface, which is used to drive the first sliding block to slide according to the predetermined movement track; a second sliding bar is disposed between the first sliding block and the second sliding block, and the second sliding bar is slidingly connected to the first driven working plane, and the other end is slidingly connected to the second driving working surface, which is used to drive the second sliding block to slide according to the predetermined movement track; the first driven working plane mates with the second sliding bar, which is used to provide a driving opportunity to guide the second sliding bar to drive the second sliding block; a third sliding bar is disposed between the second sliding block and the third sliding block; one end of the third sliding bar is slidingly connected to the second driven working plane, and the other end is slidingly connected to the third driving working plane which is used to drive the third sliding block to slide according to the predetermined movement track; the second driven working plane mates with the second sliding bar which is used to provide a driving opportunity to guide the third sliding bar to drive the third sliding block; the position of the fixed block is fixed; the fixed block is provided with a fixed bracket, the fixed bracket includes a fixed base and a guide mechanism; the fixed base mates with the first sliding bar, the second sliding bar, and the third sliding bar respectively, which is used to restrict the first sliding bar, the second sliding bar, the third sliding bar to move in a direction perpendicular to the predetermined movement track; the guide mechanism mates with the first sliding surface, the second sliding surface, the third sliding surface, which is used to guide the first sliding block, the second sliding block and the third sliding block to slide along the predetermined movement track;

The fixed block is elastically connected to one end of the second sliding block on the side of the second driving working surface, and the other end of the second sliding block on the side of the second driven working surface is elastically connected to the third sliding block, which is used to reset the second sliding block and the third sliding block when the gas bag is closed; the movement track is a horizontal straight line.

Further, the length of the first driving working surface is equal to the length of the first driven working surface; the first sliding surface includes a first sliding upper plane and a first sliding lower plane; the lengths of the first upper sliding plane and the first sliding lower plane are both greater than or equal to the length of the first driving working surface.

Further, the first driven working surface includes a first driven working plane and a first driven working slope, the first driven working slope is divided into a first driven working slope I and a first driven working slope II; the length of the second driven working surface is equal to the sum of the length of the first driven working slope I and the first driven working slope II; the second driven working surface includes a second driven working plane and a second driven working slope; the length of the second driven working surface is greater than or equal to the sum of the length of the second driven working plane and the second driven working slope.

Further, the length of the first driven working slope I is equal to the length of the second driven working plane.

Further, the length of the second driven working slope is equal to the length of the first driven working slope II.

Further, the third driving working surface includes a third driving working plane and a third driving working slope; the length of the third driving working plane is equal to twice the length of the second driven working plane, and the length of the third driving working slope is greater than or equal to twice the length of the second driven working slope;

Further, the length of the third sliding surface is greater than or equal to the length of the third driving working surface; the first driven working slope is in parallel to the second driven working surface.

Further, the angle between the second driven working slope and the predetermined movement track is β2, and the angle between the third driving working slope and the predetermined movement track is β1, β2>β1.

Beneficial Effects of the Present Invention

The present invention provides a pneumatic-controlled telescopic mechanism for robotic arms that can adjust the length of a robotic arm joint according to the specific uses and has a small and flexible joint. Compared to the prior art, the present invention has high movement precision, small and flexible joint, and is environmentally friendly and pollution-free, and the length of the joint can be changed according to the specific uses, which increases the flexibility of the robotic arm; in addition, it can enter the cavity for processing.

Figure 1:
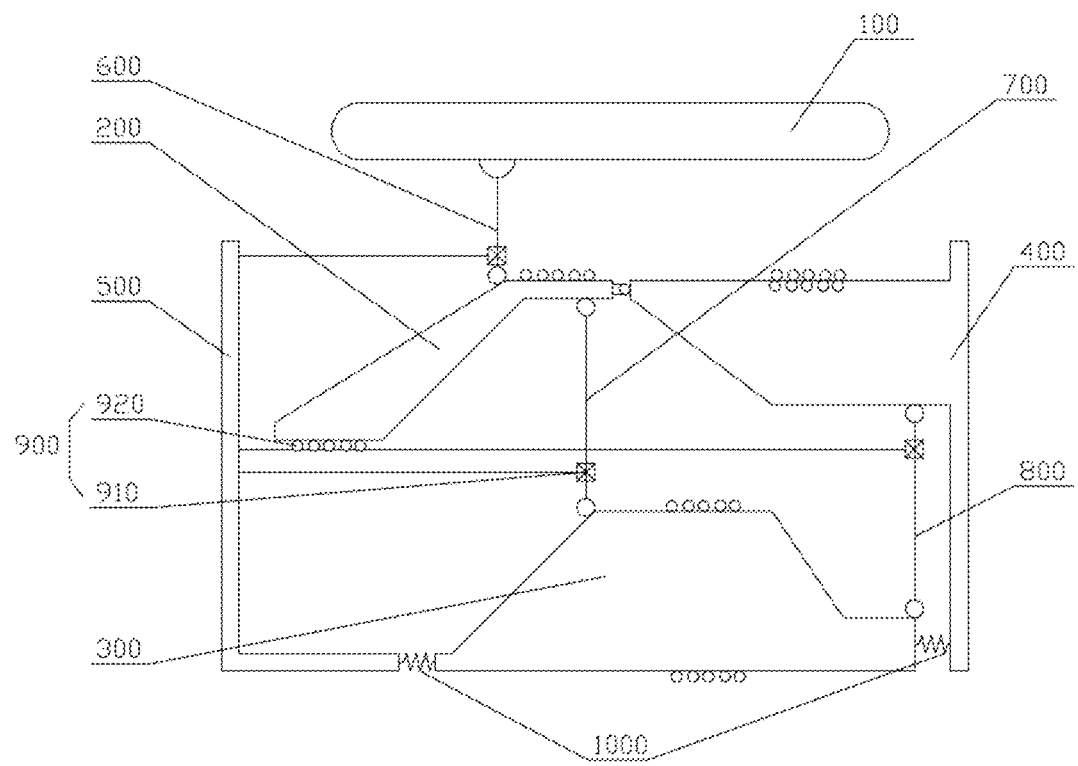
FIG. 1 is a schematic view showing the initial state of a pneumatic-controlled pitch-adjustable telescopic mechanism used for a robotic arm.
Figure 2:
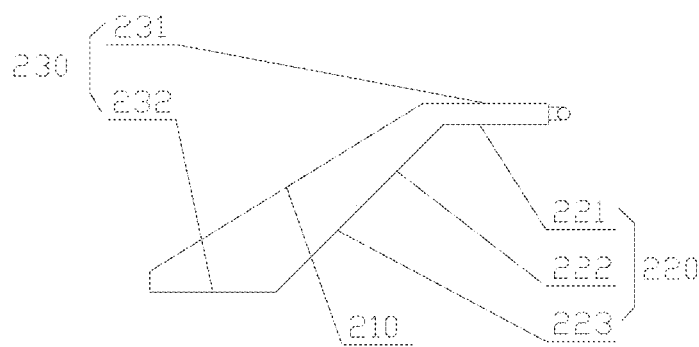
FIG. 2 is a schematic view of a first sliding block.
Figure 3:
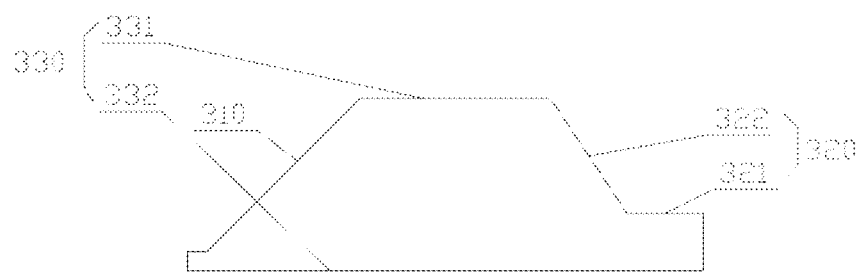
FIG. 3 is a schematic view of a second sliding block.
Figure 4:
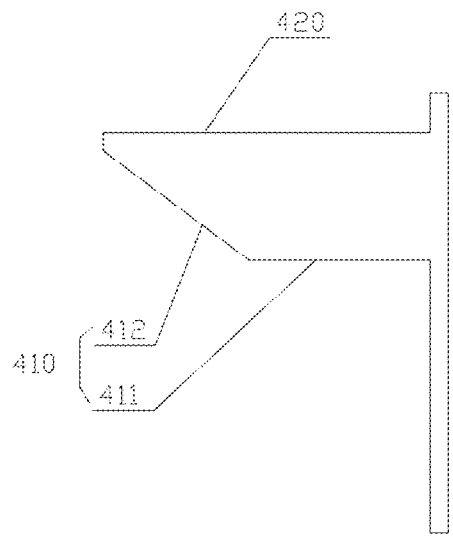
FIG. 4 is a schematic view of a third sliding block.

Notes: 100—gas bag, 200—first sliding block, 210—first driving working surface, 220—first driven working surface, 221—first driven working plane, 222—first driven working slope I, 223—first driven working slope II, 230—first sliding surface, 231—first sliding upper plane, 232—first sliding lower plane, 300—second sliding block, 310—second driving working surface, 320—second driven working surface, 321—second driven working plane, 322—second driven working slope, 330—second sliding surface, 331—second sliding upper plane, 332—second sliding lower plane, 400—third sliding block, 410—third driving working surface, 411—third driving working plane, 412—third driving working slope, 420—third sliding surface, 500—fixed block, 600—first sliding bar, 700—second sliding bar, 800—third sliding bar, 900—fixed bracket, 910—fixed base, 920—guide mechanism, 1000—spring

DETAILED DESCRIPTION OF THE PREFERRED EMBODIMENTS

Example 1

In this embodiment, a gas bag 100 is used as a driving device to provide driving power for the sliding of the first sliding block. The number of sliding blocks is 3, thereby realizing four different telescopic states. A linear bearing is used as the fixed position of the fixed base 910 in the middle of the sliding bar, the sliding bar can only move up and down, and the predetermined movement track of the sliding block is a horizontal straight line. When the gas bag 100 is closed, due to the elastic force of the spring 1000, the initial state is restored. The lower part of the figure is an elastically stretchable skin material (not shown in the figure) to prevent dust from entering the interior.

A pneumatic-controlled pitch-adjustable telescopic mechanism used for a robotic arm in this embodiment comprises a gas bag 100, a first sliding block 200, a second sliding block 300, a third sliding block 400, and a fixed block 500; the first sliding block 200 is provided with a first driving working surface 210, a first driven working surface 220 and a first sliding surface 230; the second sliding block 300 is provided with a second driving working surface 310, a second driven working surface 320 and a second sliding surface 330; the third sliding block 400 is provided with a third driving working surface 410 and a third sliding surface 420; the first sliding surface 230, the second sliding surface 330 and the third sliding surface 420 slide in parallel according to the predetermined movement track; a first sliding bar 600 is disposed between the gas bag 100 and the first sliding block 200; one end of the first sliding bar 600 is fixedly connected to the gas bag 100, and the other end is slidingly connected to the first driving working surface 210, which is used to drive the first sliding block 200 to slide according to the predetermined movement track;

A second sliding bar 700 is disposed between the first sliding block 200 and the second sliding block 300, and the second sliding bar 700 is slidingly connected to the first driven working plane 221, and the other end is slidingly connected to the second driving working surface 310, which is used to drive the second sliding block to slide according to the predetermined movement track; the first driven working plane 221 mates with the second sliding bar 700, which is used to provide a driving opportunity to guide the second sliding bar 700 to drive the second sliding block 300; a third sliding bar 800 is disposed between the second sliding block 300 and the third sliding block 400; one end of the third sliding bar 800 is slidingly connected to the second driven working plane 321, and the other end is slidingly connected to the third driving working plane 411 which is used to drive the third sliding block to slide according to the predetermined movement track; the second driven working plane 321 mates with the third sliding bar 800 which is used to provide a driving opportunity to guide the third sliding bar 800 to drive the third sliding block 400; the position of the fixed block 500 is fixed; the fixed block 500 in this embodiment is a linear bearing; the fixed block 500 is provided with a fixed bracket 900, the fixed bracket 900 includes a fixed base 910 and a guide mechanism 920; the fixed base 910 mates with the first sliding bar 600, the second sliding bar 700, and the third sliding bar 800 respectively, which is used to restrict the first sliding bar 600, the second sliding bar 700, the third sliding bar 800 to move in a direction perpendicular to the predetermined movement track; the guide mechanism 920 mates with the first sliding surface 230, the second sliding surface 330, the third sliding surface 420, which is used to guide the first sliding block 200, the second sliding block 300 and the third sliding block 400 to slide along the predetermined movement track; the fixed block 500 is connected to one end of the second sliding block 300 on the side of the second driving working surface 310 via a spring 1000, and the other end of the second sliding block 300 on the side of the second driven working surface 320 is connected to the third sliding block 400 via a spring 1000. The spring 1000 is used to reset the second sliding block 300 and the third sliding block 400 when the gas bag 100 is closed.

In this embodiment, the length of the first driving working surface 210 is equal to the length of the first driven working surface 220; the first sliding surface 230 includes a first sliding upper plane 231 and a first sliding lower plane 232; the lengths of the first upper sliding plane 231 and the first sliding lower plane 232 are both greater than or equal to the length of the first driving working surface 210.

The first driven working surface 220 includes a first driven working plane 221 and a first driven working slope, the first driven working slope is divided into a first driven working slope I 222 and a first driven working slope II 223; the length of the second driving working surface 310 is equal to the sum of the length of the first driven working slope I 222 and the first driven working slope II 223.

The second driven working surface 320 includes a second driven working plane 321 and a second driven working slope 322; the length of second driving working surface 310 is greater than or equal to the sum of the length of the second driven working plane 321 and the second driven working slope 322.

The length of the first driven working slope I 222 is equal to the length of the second driven working plane 321. The length of the second driven working slope 322 is equal to the length of the first driven working slope II 223.

The third driving working surface 410 includes a third driving working plane 411 and a third driving working slope 412; the length of the third driving working plane 411 is equal to twice the length of the second driven working plane 321, and the length of the third driving working slope 412 is greater than or equal to twice the length of the second driven working slope 322; the length of the third sliding surface 420 is greater than or equal to the length of the third driving working surface 410.

In this embodiment, the first driven working slope is in parallel to the second driving working surface 310.

In this embodiment, the predetermined sliding track of the first sliding block 200, the second sliding block 300 and the third sliding block 400 is a horizontal straight line. The angle between the second driven working slope 322 and the predetermined movement track is β2, and the angle between the third driving working slope 412 and the predetermined movement track is β1, β2>β1.

Figure 8:
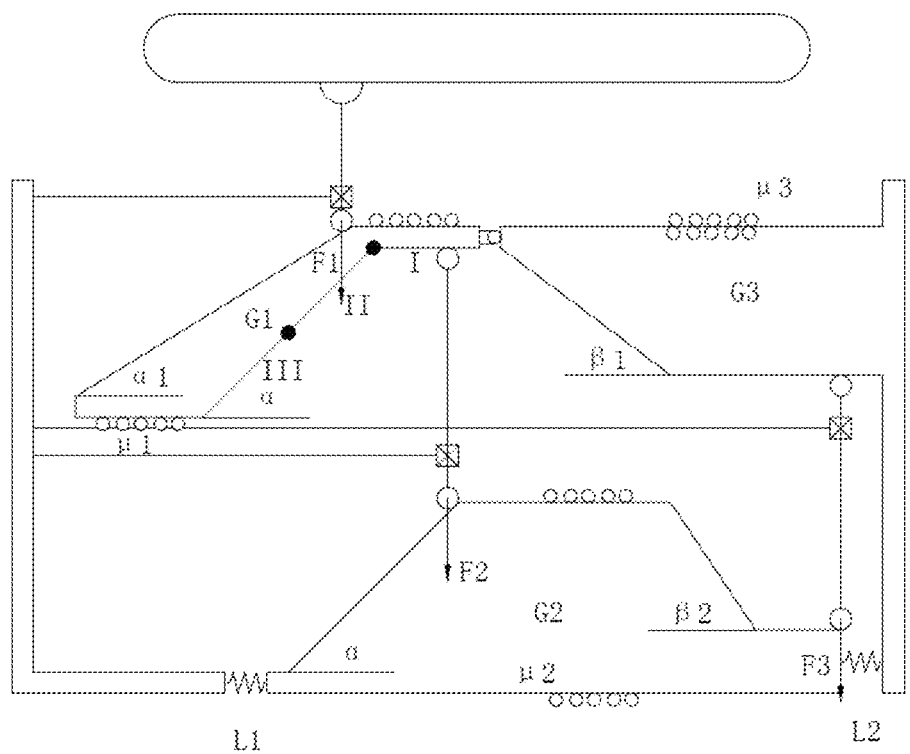
FIG. 8 is a schematic view showing the calculation and analysis.
Figure 9:
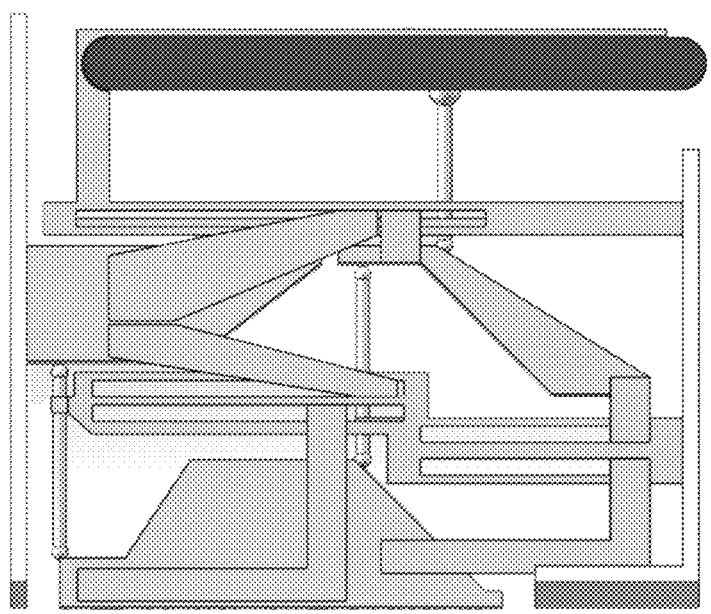
FIG. 9 is a schematic view of assembly structure.

The working principle (force and motion analysis) of this embodiment is as follows: In this embodiment, the spring 1000 is selected as the elastic connection between the second sliding block 300 and the fixed block 500, between the second sliding block 300 and the third sliding block 400, which only has a resetting role; it is assumed that the gravity of the first sliding block 200 is G1 and the damping coefficient is μ1; the gravity of the second sliding block 300 is G2 and the damping coefficient is μ2; the gravity of the third sliding block 400 is G3 and the damping coefficient is μ3; the force in the vertical direction of the first sliding bar 600 is F1; the force in the vertical direction of the second sliding bar 700 is F2; the force in the vertical direction of the third sliding bar 800 is F3; the angle of the inclined plane is shown in FIG. 8. Since the power source is F1 determined by air pressure, in order to understand the air pressure required during different movement states, only F1 needs to be calculated.

Figure 5:
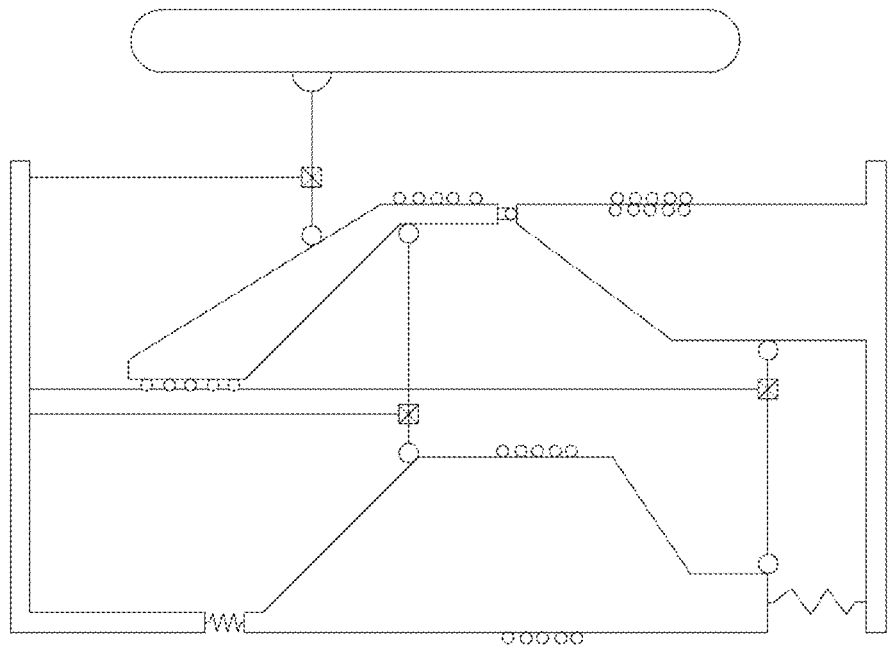
FIG. 5 is a schematic view of a second state.

When inflated, the gas bag pushes the first sliding bar 600 to move down, such that the first sliding block 200 slides to the right; in the process I, the gas bag 100 will make the upper part of the second sliding bar to contact the rolling ball at different positions in FIG. 1 according to the different air pressure ranges. During the process I, the first sliding block 200 and the third sliding block 300 move one unit distance X to the right, L1 remains unchanged, and L2 increases by one unit distance X to a state as shown in FIG. 5;

According to the force analysis, it is obtained $$F1 = \frac{\mu 1(F1 + G1) + \mu 3 G3}{\tan \alpha 1};$$

simplified to $$F1 = \frac{\mu 1 G1}{\tan \alpha 1 - \mu 1} + \frac{\mu 3 G3}{\tan \alpha 1 - \mu 1};$$

Figure 6:
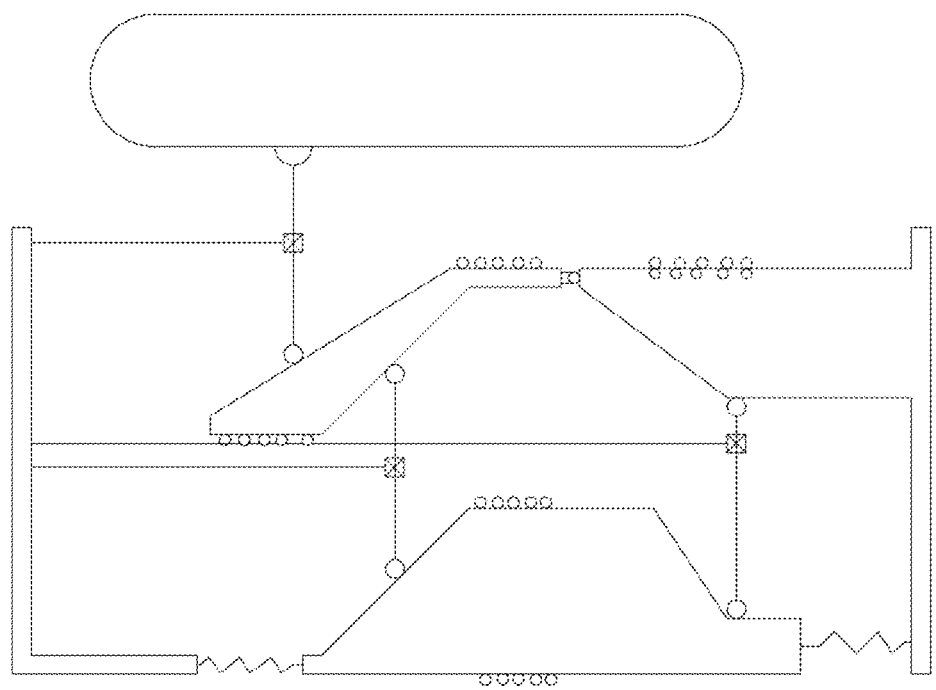
FIG. 6 is a schematic view of a third state.

When the air pressure rises to the state II, the first sliding block 200, the second sliding block 300, and the third sliding block 400 move one unit distance X to the right, L2 remains unchanged, and L1 increases by one unit distance X to a state as shown in FIG. 6;

At this time, according to the force analysis, it is obtained $$F2 = \frac{\mu 2 G2}{\tan \alpha - \mu 2};$$

similarly, it is obtained $$F1 = \frac{\mu 1 G1}{\tan\alpha 1 - \mu 1} + \frac{\mu 3 G3}{\tan\alpha 1 - \mu 1} + \frac{\tan\alpha \mu 2 G2}{(\tan\alpha 1 - \mu 1)(\tan\alpha - \mu 2)};$$

Figure 7:
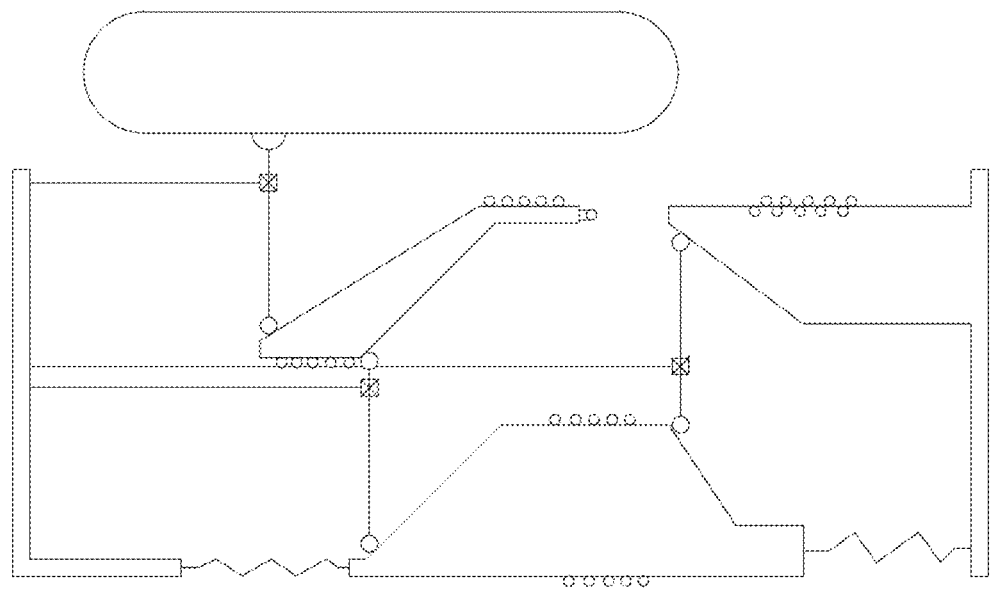
FIG. 7 is a schematic view of a final elongation state.

When the air pressure rises to the state III, the first sliding block 200 and the second sliding block 300 move one unit distance X to the right. Because the second sliding block 200 and the third sliding block 300 have different working plane angles, the third sliding block 400 moves two units distance X to the right at this time, such that L1 and L2 each increase by a unit distance X to the final state as shown in FIG. 7;

At this time, according to the force analysis, it is obtained $$F3 = \frac{\mu 3 G3}{\tan\beta 1 - \mu 3}; \quad F2 = \frac{\mu 2 G2 + F3\mu 2 + F3\tan\beta 2}{\tan\alpha - \mu 2};$$

$$F1 = \frac{\mu 1 G1 + F2\mu 1 + F2\tan\alpha}{\tan\alpha 1 - \mu 1};$$

After substitution and simplification, it is obtained $$F1 = \frac{\mu 1 G1}{\tan\alpha 1 - \mu 1} + \frac{\tan\alpha \mu 2 G2}{(\tan\alpha 1 - \mu 1)(\tan\alpha - \mu 2)} - \frac{\mu 1 \mu 2 G2}{(\tan\alpha 1 - \mu 1)(\tan\alpha - \mu 2)} + \frac{\mu 2\tan\beta 2 \mu 3 G3 (\tan\alpha - \mu 1)}{(\tan\alpha 1 - \mu 1)(\tan\alpha - \mu 2)(\tan\beta 1 - \mu 3)};$$

In summary, to meet the requirements for structural motion, the following conditions should be satisfied:

$$0 < \frac{\mu 1 G1}{\tan\alpha 1 - \mu 1} + \frac{\mu 3 G3}{\tan\alpha 1 - \mu 1};$$

$$\frac{\mu 1 G1}{\tan\alpha 1 - \mu 1} + \frac{\mu 3 G3}{\tan\alpha 1 - \mu 1} < \frac{\mu 1 G1}{\tan\alpha 1 - \mu 1} + \frac{\mu 3 G3}{\tan\alpha 1 - \mu 1} + \frac{\tan\alpha \mu 2 G2}{(\tan\alpha 1 - \mu 1)(\tan\alpha - \mu 2)};$$

$$\frac{\mu 1 G1}{\tan\alpha 1 - \mu 1} + \frac{\mu 3 G3}{\tan\alpha 1 - \mu 1} + \frac{\tan\alpha \mu 2 G2}{(\tan\alpha 1 - \mu 1)(\tan\alpha - \mu 1)} < \frac{\mu 1 G1}{\tan\alpha 1 - \mu 1} + \frac{\tan\alpha \mu 2 G2}{(\tan\alpha 1 - \mu 1)(\tan\alpha - \mu 2)} - \frac{\mu 1 \mu 2 G2}{(\tan\alpha 1 - \mu 1)(\tan\alpha - \mu 2)} + \frac{\mu 2\tan\beta 2 \mu 3 G3(\tan\alpha - \mu 1)}{(\tan\alpha 1 - \mu 1)(\tan\alpha - \mu 2)(\tan\beta 1 - \mu 3)};$$

Since μ1, G1, μ2, G2, μ3, G3 are all positive numbers, after simplification, it can be obtained:

$$\tan\alpha 1 > \mu 1 > 0;$$

$$\tan\alpha > \mu 2 > 0;$$

$$\mu 3 G3(\tan\alpha - \mu 2) + \mu 1 \mu 2 G2 < \frac{\mu 2\tan\beta 2 \mu 3 G3(\tan\alpha - \mu 1)}{(\tan\beta 1 - \mu 3)};$$

When $$F1 < \frac{\mu 1 G1}{\tan\alpha 1 - \mu 1} + \frac{\mu 3 G3}{\tan\alpha 1 - \mu 1},$$

the mechanism is in a state as shown in FIG. 1;

When $$\frac{\mu 1 G1}{\tan\alpha 1 - \mu 1} + \frac{\mu 3 G3}{\tan\alpha 1 - \mu 1} < F1 < \frac{\mu 1 G1}{\tan\alpha 1 - \mu 1} + \frac{\mu 3 G3}{\tan\alpha 1 - \mu 1} + \frac{\tan\alpha \mu 2 G2}{(\tan\alpha 1 - \mu 1)(\tan\alpha - \mu 2)},$$

the mechanism moves from the state shown in FIG. 1 to the state shown in FIG. 5, and then stops.

When $$\frac{\mu 1 G1}{\tan\alpha 1 - \mu 1} + \frac{\mu 3 G3}{\tan\alpha 1 - \mu 1} + \frac{\tan\alpha \mu 2 G2}{(\tan\alpha 1 - \mu 1)(\tan\alpha - \mu 2)} < F1 < \frac{\mu 1 G1}{\tan\alpha 1 - \mu 1} + \frac{\tan\alpha \mu 2 G2}{(\tan\alpha 1 - \mu 1)(\tan\alpha - \mu 2)} - \frac{\mu 1 \mu 2 G2}{(\tan\alpha 1 - \mu 1)(\tan\alpha - \mu 2)} + \frac{\mu 2\tan\beta 2 \mu 3 G3(\tan\alpha - \mu 1)}{(\tan\alpha 1 - \mu 1)(\tan\alpha - \mu 2)(\tan\beta 1 - \mu 3)},$$

the mechanism moves from the state shown in FIG. 5 to the state shown in FIG. 6, and then stops.

When $$F1 > \frac{\mu 1 G1}{\tan\alpha 1 - \mu 1} + \frac{\tan\alpha \mu 2 G2}{(\tan\alpha 1 - \mu 1)(\tan\alpha - \mu 2)} - \frac{\mu 1 \mu 2 G2}{(\tan\alpha 1 - \mu 1)(\tan\alpha - \mu 2)} + \frac{\mu 2\tan\beta 2 \mu 3 G3(\tan\alpha - \mu 1)}{(\tan\alpha 1 - \mu 1)(\tan\alpha - \mu 2)(\tan\beta 1 - \mu 3)},$$

the mechanism moves from the state shown in FIG. 6 to the state shown in FIG. 7, and then stops.

The foregoing description is only preferred embodiments of the present invention and is not intended to limit the technical scope of the present invention. Therefore, any minor amendments, equivalent changes and modifications made to the above embodiments based on the technical essence of the present invention will still fall within the scope of the technical solution of the present invention.

What is claimed is:

1. A pneumatic-controlled pitch-adjustable telescopic mechanism used for a robotic arm, comprising a sliding block, a fixed block and a driving device, the fixed block is in a fixed position; the sliding block slides relative to the fixed block according to a predetermined movement track, which is used to adjust a distance between the sliding block and the fixed block; the driving device is used to provide power to drive; a sliding bar is disposed between the driving device and the sliding block, one end of the sliding bar is fixedly connected to the driving device, and the other end is slidingly connected to the sliding block, which is used to drive the sliding block to slide according to the predetermined movement track; the fixed block is provided with a fixed bracket, and the fixed bracket comprises a fixed base and a guide mechanism, the fixed base mates with the sliding bar, which is used to restrict the sliding bar from moving in a direction non-parallel to the predetermined movement track; the guide mechanism mates with the sliding block, which is used to guide the sliding block to slide along the predetermined movement track.

2. The pneumatic-controlled pitch-adjustable telescopic mechanism used for the robotic arm according to claim 1, wherein a number of the sliding blocks is N, and N is greater than or equal to 2, the sliding blocks include a first sliding block, a second sliding block . . . , a N-1-th sliding block, and a N-th sliding block respectively; the N-1-th sliding block slides relatively parallel to the N-th sliding block; the first sliding block is provided with a first driving working surface, a first driven working surface, and a first sliding surface; the N-1-th sliding block is provided with a N-1-th driving working surface, a N-1-th driven working surface and a N-1-th sliding surface, and the N-th sliding block is provided with a N-th driving working surface, a N-th driven working surface and a N-th sliding surface; a first sliding bar is set between the first sliding block and the driving device; one end of the first sliding bar is fixedly connected to the driving device, and the other end is slidingly connected to the first driving working surface, which is used to drive the first sliding block to slide according to the predetermined movement track; the N-1-th sliding block provides driving power for the N-th sliding block; a N-th sliding bar is disposed between the N-1-th sliding block and the N-th sliding block, the N-th sliding bar is slidingly connected to the N-1-th driven working plane, and the other end is slidingly connected to the N-th driving working surface, which is used to drive the N-th sliding block to slide according to the predetermined movement track; the N-1-th driven working plane mates with the N-th sliding bar, which is used to provide a driving opportunity to guide the N-th sliding bar to drive the N-th sliding block; the fixed block and the first sliding block are connected elastically, which is used to reset the first sliding block; the N-1-th sliding block and the N-th sliding block are connected elastically, which is used to reset the N-th sliding block; the guide mechanism mates with the N-1-th sliding surface and the N-th sliding surface, which is used to guide the N-1-th sliding block and the N-th sliding block to slide along the predetermined movement track.

3. The pneumatic-controlled pitch-adjustable telescopic mechanism used for the robotic arm according to claim 2, wherein the number of the sliding blocks is three, which are the first sliding block (200), the second sliding block (300) and the third sliding block (400), and the driving device is a gas bag (100); the first sliding block (200) is provided with the first driving working surface (210), the first driven working surface (220) and the first sliding surface (230); the second sliding block (300) is provided with a second driving working surface (310), a second driven working surface (320) and a second sliding surface (330); the third sliding block (400) is provided with a third driving working surface (410) and a third sliding surface (420); the first sliding surface (230), the second sliding surface (330) and the third sliding surface (420) slide in parallel according to the predetermined movement track; the gas bag (100) is used to provide power to drive the sliding block to slide; a first sliding bar (600) is disposed between the gas bag (100) and the first sliding block (200); one end of the first sliding bar (600) is fixedly connected to the gas bag (100), and the other end is slidingly connected to the first driving working surface (210), which is used to drive the first sliding block (200) to slide according to the predetermined movement track; a second sliding bar (700) is disposed between the first sliding block (200) and the second sliding block (300), and the second sliding bar (700) is slidingly connected to a first driven working plane (221), and the other end is slidingly connected to the second driving working surface (310), which is used to drive the second sliding block to slide according to the predetermined movement track; the first driven working plane (221) mates with the second sliding bar (700), which is used to provide a driving opportunity to guide the second sliding bar (700) to drive the second sliding block (300); a third sliding bar (800) is disposed between the second sliding block (300) and the third sliding block (400); one end of the third sliding bar (800) is slidingly connected to a second driven working plane (321), and the other end is slidingly connected to a third driving working plane (411) which is used to drive the third sliding block to slide according to the predetermined movement track; the second driven working plane (321) mates with the third sliding bar (800) which is used to provide a driving opportunity to guide the third sliding bar (800) to drive the third sliding block (400); the position of the fixed block (500) is fixed; the fixed block (500) is provided with a fixed bracket (900), the fixed bracket (900) includes a fixed base (910) and a guide mechanism (920); the fixed base (910) mates with the first sliding bar (600), the second sliding bar (700), and the third sliding bar (800) respectively, which is used to restrict the first sliding bar (600), the second sliding bar (700), the third sliding bar (800) to move in a direction perpendicular to the predetermined movement track; the guide mechanism (920) mates with the first sliding surface (230), the second sliding surface (330), the third sliding surface (420), which is used to guide the first sliding block (200), the second sliding block (300) and the third sliding block (400) to slide along the predetermined movement track; the fixed block (500) is elastically connected to one end of the second sliding block (300) on the side of the second driving working surface (310), and the other end of the second sliding block (300) on the side of the second driven working surface(320) is elastically connected to the third sliding block (400), which is used to reset the second sliding block (300) and the third sliding block (400) when the gas bag (100) is closed;

the movement track is a horizontal straight line.

4. The pneumatic-controlled pitch-adjustable telescopic mechanism used for the robotic arm according to claim 3, wherein a length of the first driving working surface (210) is equal to a length of the first driven working surface (220); the first sliding surface (230) includes a first sliding upper plane (231) and a first sliding lower plane (232); lengths of the first upper sliding plane (231) and the first sliding lower plane (232) are both greater than or equal to the length of the first driving working surface (210).

5. The pneumatic-controlled pitch-adjustable telescopic mechanism used for the robotic arm according to claim 4, wherein the first driven working surface (220) includes the first driven working plane (221) and a first driven working slope, the first driven working slope is divided into a first driven working slope I (222) and a first driven working slope II (223); a length of the second driven working surface (320) is equal to a sum of lengths of the first driven working slope I (222) and the first driven working slope II (223); the second driven working surface (320) includes the second driven working plane (321) and a second driven working slope (322); the length of the second driven working surface (310) is greater than or equal to a sum of lengths of the second driven working plane (321) and the second driven working slope (322).

6. The pneumatic-controlled pitch-adjustable telescopic mechanism used for the robotic arm according to claim 5, wherein the length of the first driven working slope I (222) is equal to the length of the second driven working plane (321).

7. The pneumatic-controlled pitch-adjustable telescopic mechanism used for the robotic arm according to claim 6, wherein the length of the second driven working slope (322) is equal to the length of the first driven working slope II (223).

8. The pneumatic-controlled pitch-adjustable telescopic mechanism used for the robotic arm according to claim 7, wherein the third driving working surface (410) includes the third driving working plane (411) and a third driving working slope (412); a length of the third driving working plane (411) is equal to twice the length of the second driven working plane (321), and a length of the third driving working slope (412) is greater than or equal to twice the length of the second driven working slope (322).

9. The pneumatic-controlled pitch-adjustable telescopic mechanism used for the robotic arm according to claim 8, wherein the length of the third sliding surface (420) is greater than or equal to the length of the third driving working surface (410); and the first driven working slope is in parallel to the second driven working surface (320).

10. The pneumatic-controlled pitch-adjustable telescopic mechanism used for the robotic arm according to claim 9, wherein an angle between the second driven working slope (322) and the predetermined movement track is β2, and an angle between the third driving working slope (412) and the predetermined movement track is β1,β2>β1.

\* \* \* \* \*